United States Patent [19]
Akamatsu et al.

[11] 3,948,863
[45] Apr. 6, 1976

[54] SOLID, WATER-INSOLUBLE POLYPEPTIDES HAVING IONIZABLE SIDE CHAINS

[75] Inventors: Akira Akamatsu, Yokohama; Katsunobu Matsushita, Kawasaki; Sadao Koizumi, Yokohama, all of Japan

[73] Assignee: Ajinomoto Co., Inc., Tokyo, Japan

[22] Filed: May 30, 1974

[21] Appl. No.: 474,664

Related U.S. Application Data
[63] Continuation-in-part of Ser. No. 403,156, Oct. 3, 1973, abandoned.

[30] Foreign Application Priority Data
Oct. 18, 1972  Japan.............................. 47-104250

[52] U.S. Cl........... 260/78 A; 128/335.5; 210/38 B; 210/500 M; 260/2.1 R; 260/29.2 N; 260/31.2 N; 260/33.4 R; 260/78 SC
[51] Int. Cl.$^2$.................... C08G 69/10; C08G 69/48
[58] Field of Search........... 260/78 A, 2.2 R, 78 SC, 260/78 TF

[56] References Cited
UNITED STATES PATENTS
3,436,372  4/1969  Hoegger.......................... 260/78 TF
3,585,161  6/1971  Akamatsu et al................. 260/78 A
3,787,482  1/1974  Bersworth........................ 260/78 A
3,867,352  5/1974  Akamatsu et al................. 260/78 A OTHER PUBLICATIONS
Flory – Principles of Polymer Chemistry, 1953, pp. 75–78, 102–103.

*Primary Examiner*—Harold D. Anderson
*Attorney, Agent, or Firm*—Hans Berman; Kurt Kelman

[57] ABSTRACT

Solid bodies of polypeptides having repeating units of aspartic, glutamic, and aminoadipic esters are reacted with hydrazine or an amine having at least two $NH_2$ groups until the ester moieties of the side chains are partly converted to the hydrazines or amides, and the side chains are partly crosslinked hydrazides other units by reaction with the hydrazine or diamine so as to make the polypeptide insoluble and infusible. The remaining ester moieties are saponified, and the resulting hydrophilic, but water-insoluble solid acts as an ampholyte in contact with water or other polar solvents. It may be used for capturing heavy metal ions from their aqueous solutions.

6 Claims, 4 Drawing Figures

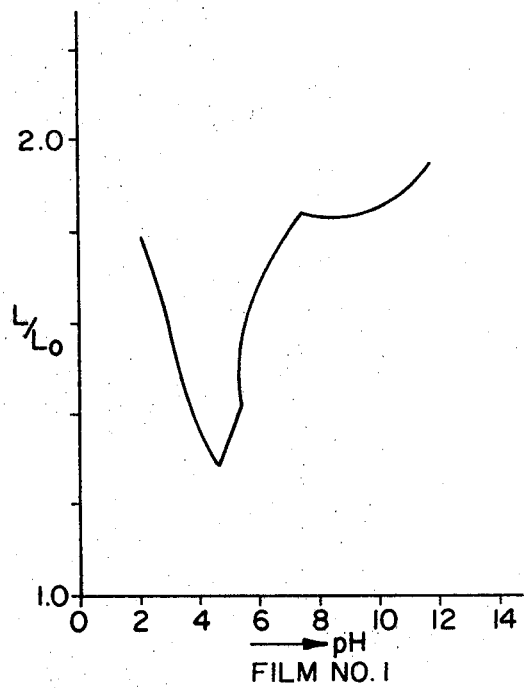
FIG.1 FILM NO.1
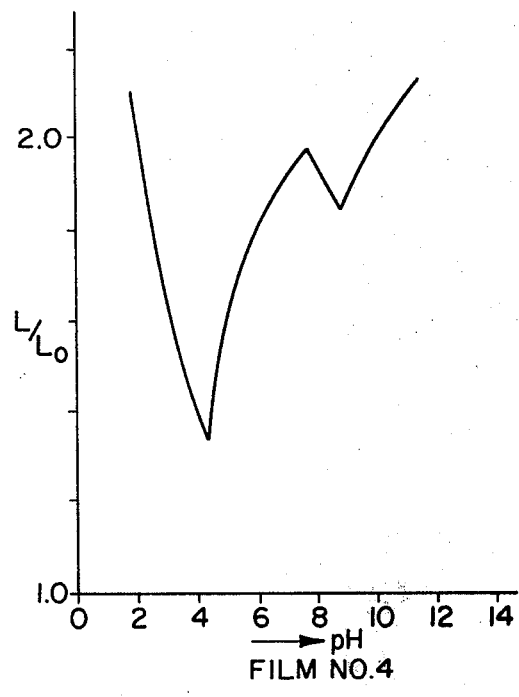
FIG.2 FILM NO.4
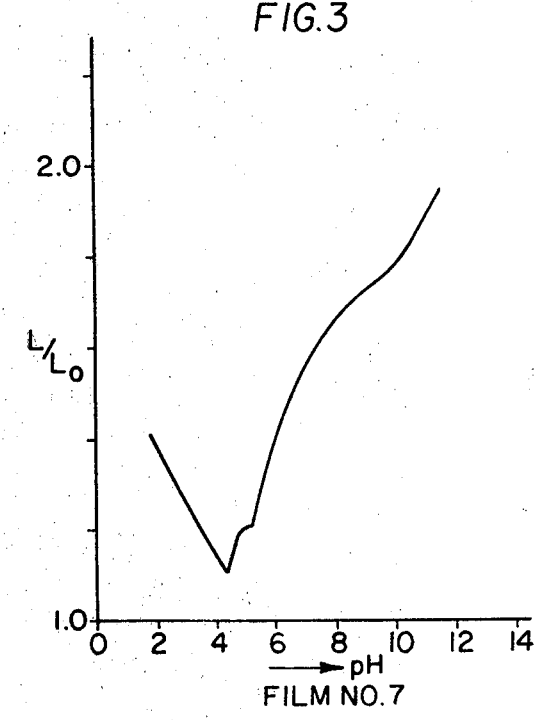
FIG.3 FILM NO.7
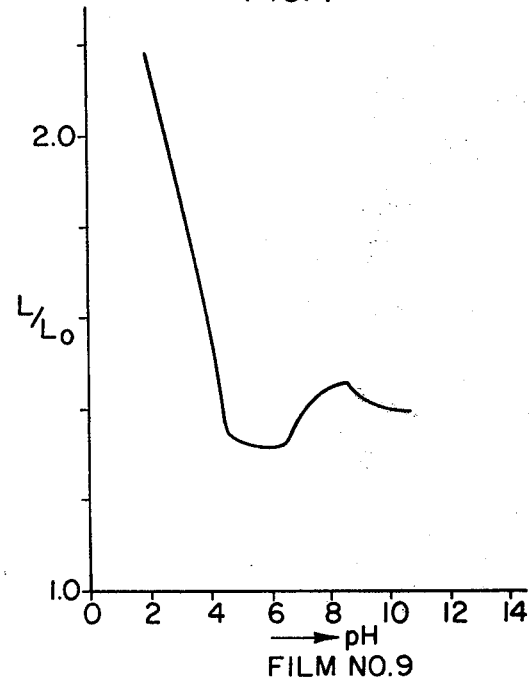
FIG.4 FILM NO.9

SOLID, WATER-INSOLUBLE POLYPEPTIDES HAVING IONIZABLE SIDE CHAINS

This application is a continuation-in-part of the copending application Ser. No. 403,156, filed Oct. 3, 1973, and now abandoned.

This invention relates to polypeptides, and particularly to improved shaped bodies of polypeptides having repeating units of the formula

wherein $n$ is 1, 2, or 3, and to a method of preparing the same.

The known polyamino acid esters or polypeptides derived from aspartic, glutamic, and α-aminoadipic acid having repeating units of the formula

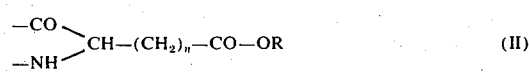

wherein $n$ is as above, and R is lower alkyl having one to four carbon atoms, or phenyl-lower-alkyl, become water-soluble or lose wet-strength when saponified.

It has now been found that shaped, solid polypeptide bodies having the repeating units of formula (II) may be reacted with hydrazine or with an amine having at least two primary amino groups until the carboalkoxy or carbophenylalkoxy groups in a portion of the units are converted to primary hydrazide or amide moieties corresponding to the hydrazine or amine reactant, another portion of the repeating units is cross-linked by the hydrazine or amine, while the remainder of the carboalkoxy groups remains unchanged. The ratio of the three portions can be varied in a reproducible manner by selecting process variables.

Modified polypeptide bodies having valuable properties are obtained when the remaining carboalkoxy and carbophenylalkoxy groups are saponified. The products differ in their properties according to the distribution of the three types of side chains on the polypeptide backbone of the macromolecule.

The improved products of the invention are solid bodies essentially consisting of at least one polypeptide having repeating units of the formula

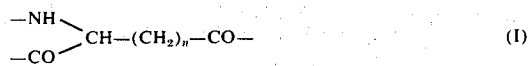

wherein $n$ is 1, 2, or 3, the group —(CH$_2$)$_n$-CO— constitutes a side chain of each unit, and the CO group in the side chain of a first portion of the units is bound by a primary amide linkage to nitrogen in the monovalent radical of hydrazine or of an amine having at least two primary amino groups. The two CO groups in respective side chains of a second portion of the repeating units are linked by primary amide bonds to respective nitrogen atoms in divalent radicals of the afore-mentioned hydrazine or amine, while the remainder of the units constitutes a third portion of units whose side chains have the formula

wherein R' is hydrogen or metal, each of the three portions amounting to at least two percent of the total number of the units, the first portion amounting to not more than 96 percent of the total number, and the second portion constituting up to one half of this number.

The units of formulas (I) and (II) are derived from aspartic, glutamic, or α-amino adipic acid, and they may constitute substantially the entire polypeptide body. The advantages of this invention, however, are also available in copolymers in which the above units are connected by peptide bonds to repeating units of one or more neutral amino acids in the backbone of the molecule.

The modified polypeptides of the invention have terminal amino groups and carboxyl groups in their side chains. They are hydrophilic and amphoteric and form hydrogels in contact with water while being insoluble in water. The shaped bodies essentially consisting of such polypeptides change their size or volume when immersed in an aqueous organic solvent if the water content of the solvent is changed. They also change their size in response to a pH change in a surrounding liquid. They are eminently suitable as semi-permeable membranes, and their permeability may be varied at will by selecting the pH of a liquid in contact with them. The saponified side chains of Formula (III) in which R' is hydrogen or alkali metal capture metal ions other than alkali metal ions, such as those of Ca, Sr, Ba, Fe, Co, Ni, Cu, Zn, Pd, Cd, and Hg, from ambient solutions.

The properties outlined above make polypeptide sheets or films of the invention useful as ion exchange membranes, membranes for ultrafiltration and reverse osmosis, and the like. Depending on the degree of cross linking, they may be used as fibers for textile applications or for application in surgical sutures, in medicinal capsules, and for encapsulating materials other than therapeutic compositions.

The neutral amino acids which may link the repeating acidic amino acid units of Formula (I) in a peptide chain forming the backbone of the polymeric molecule include glycine, alanine, valine, norvaline, leucine, isoleucine, norleucine, phenylalanine, methionine, also basic amion acids in which one amino group is masked by acyl groups, as in N -acetyllysine, N -butyrylly-sine, N -carbobenzoxylysine, N -acetylornithine, and N -butyrylornithine. Serine, tyrosine, and threonine may be present if their hydroxyl groups are masked as in O-methylserine, O-acetylserine, O-methylthreonine, and O-acetyltyrosine. In an analogous manner, S-benzylcysteine provides a suitable, neutral linking member.

Optical activity is not relevant to this invention, and all amino acids and their derivatives referred to herein may be in the optically active or racemic form.

The homopolymers or copolymers which constitute the polypeptide bodies may be prepared in any manner known, and the preparation of the starting materials is not part of this invention nor is the invention concerned with the known shaping methods for these polymers. The ratio of acidic amino acids units and neutral amino acid units may be varied to modify the properties of the copolymer in a manner well understood in this art.

The amines which are reacted with the polymeric ester units of formula (II) must have at least two primary amino groups. They may have more than two, but their structure otherwise is not critical as is partly evident from the fact that hydrazine is also well suited for preparing the shaped polypeptide bodies of the invention. More than two primary amino groups enhance cross linking and result in products which may be too hard for some applications while preferable for others. Aromatic diamines or polyamines generally react more slowly than aliphatic or cycloaliphatic analogs, but are otherwise useful. Amines having only secondary amino groups react too slowly for practical application in the method of this invention.

Amines which can be used successfully in this invention include aliphatic di- and polyamines having straight or branched carbon chains such as ethylenediamine, propylenediamine, butylenediamine, pentylenediamine, hexylenediamine, octylenediamine, nonylenediamine, decylenediamine, 1,3-diamino-2-propanol, diethylenetriamine, iminobispropylamine, bis(hexamethylene)triamine, triethylenetetramine, tetraethylenepentamine, pentaethylenehexamine, methyliminobispropylamine; additionally lower alkyl esters of basic amino acids (such as arginine, lysine, and ornithine), polyetherdiamines such as polyoxypropylene etherdiamine (Jeffamine); also alicyclic amines including menthanediamine, 1,3-diaminocyclohexane, 4,4'-diaminobicyclohexyl, 3,3'-dimethyl-4,4'-didminobicyclohexyl, 4,4'-diaminomethylenebiscyclohexane, 4,4'-diamino-(propane-2,2'-biscyclohexane), 3,3'-dimethyl-4,4'-diaminomethylenebiscyclohexyl, 1,3-diaminomethylcyclohexane, and 1-amino-3-aminomethyl-3,5,5-trimethylcyclohexane; furthermore heterocyclic amines including 2,4-diamino-5-aminomethylpyrimidine, 2,4,6-triaminopyrimidine, 3,9-bis(aminoethyl) spirobis(metadioxane); and aromatic diamines including the three isomeric phenylenediamines, 1,4-naphthylenediamine, 3,3'-biphenylenediamine, 3,4-diaminotoluene, and metaxylenediamine. This list, of course, is merely indicative of the wide range of diamines suitable for this invention.

The amine may be reacted with the solid shaped polypeptide body in a liquid medium which may consist of the amine alone, the latter term being understood to include hydrazine. Solvents chemically inert to the amine may be present if they do not dissolve the polymer, but a solvent capable of being absorbed by the polymer is often desirable to hasten penetration of the shaped body by the amine reactant. Suitable solvents include, but are not limited to, dimethylformamide, dimethylacetamide, N-methylpyrrolidone, dioxane, tetrahydrofuran, benzene toluene, chlorobenzene, dichlorobenzene, methylene chloride, carbon tetrachloride, dichloroethane, trichloroethylene, tetrachloroethylene, and the like. The solvent, while inert, may affect the rate of reaction between the amine and the polymer.

At high reaction rates, cross linking is reduced and the formation of side chains having terminal amino groups is enhanced so that the distribution of the several types of side chains may be controlled by the selection of a suitable solvent. Under otherwise comparable conditions, the rate of the reaction is also affected by the nature of the amine, its concentration in the reaction medium, and the temperature. Tertiary amines, such as triethylamine, catalytically accelerate the reaction.

The residual carboalkoxy or carbophenylalkoxy groups may be saponified by conventional methods. Alkaline saponification agents such as the hydroxides of the alkali and alkaline earth metals are employed in at least partly aqueous media which may further contain water-miscible organic solvents such as the lower alkanols, lower ketones, or dioxane. The phenylalkyl esters are readily converted to the free acids by means of hydrogen bromide or phosphonium iodide, as is known in itself.

The invention will be illustrated hereinbelow in Examples relating to specific embodiments, partly with reference to the attached drawing in which FIGS. 1 to 4 diagrammatically illustrate changes in dimensions of polypeptide bodies of the invention in aqueous media of different pH.

All percentage values and parts referred to in these Examples are by weight unless stated otherwise. The indicated values of intrinsic viscosity were determined at 30°C in dichloroacetic acid.

EXAMPLE 1

A film of poly-γ-methyl-D-glutamate, 32 microns thick, was cut into pieces 50 mm square, and the pieces were immersed in solutions of hydrazine in mixtures of benzylalcohol and water for 1, 2, and 3 hours, the hydrazine concentration being 60% in a solvent of 2 parts benzyl alcohol and 1 part water, 67% in a 1:1 solvent mixture, and 73% in 1 part benzyl alcohol and 2 parts water.

The treated film samples were washed with water until free from hydrazine and solvent, airdried, and analyzed for nitrogen content and also for methoxyl groups by the method of F. Viebock and C. Brecher. From the analysis results, the numerical percentage ratio of hydrazide (H) side chains, cross-linked (CL) side chains, and residual ω-carbomethoxy (CM) side chains was calculated. The results are listed in Table 1.

TABLE 1

| Run No. | $(NH_2)_2$ % | Immersed Hrs. | H | Side chains CL | CM |
|---|---|---|---|---|---|
| 1 | 60 | 1 | 49 | 14 | 37 |
| 2 | 60 | 2 | 87 | 9 | 4 |
| 3 | 60 | 3 | 93 | 5 | 2 |
| 4 | 67 | 1 | 35 | 21 | 44 |
| 5 | 67 | 2 | 82 | 11 | 7 |
| 6 | 67 | 3 | 96 | 2 | 2 |
| 7 | 73 | 1 | 10 | 30 | 60 |
| 8 | 73 | 2 | 42 | 32 | 26 |
| 9 | 73 | 3 | 80 | 12 | 8 |

The procedure was repeated with 40% hydrazine in aqueous 83% dimethylformamide (DMF), 60% hydrazine in 63% DMF, and 67% hydrazine in 50% DMF, and the results are indicated in Table 2.

TABLE 2

| Run No. | $(NH_2)_2$ % | Immersed Hrs. | H | Side chains CL | CM |
|---|---|---|---|---|---|
| 10 | 40 | 1 | 2 | 15 | 83 |
| 11 | 40 | 2 | 6 | 29 | 65 |
| 12 | 40 | 3 | 16 | 38 | 46 |
| 13 | 40 | 6 | 28 | 49 | 23 |
| 14 | 60 | 1 | 4 | 19 | 77 |
| 15 | 60 | 2 | 11 | 31 | 58 |
| 16 | 60 | 3 | 20 | 40 | 40 |
| 17 | 60 | 6 | 54 | 29 | 27 |
| 18 | 67 | 1 | 6 | 20 | 74 |
| 19 | 67 | 2 | 16 | 24 | 60 |
| 20 | 67 | 3 | 32 | 20 | 48 |
| 21 | 67 | 6 | 60 | 16 | 24 |

A third group of films was immersed in solutions containing 40% hydrazine in aqueous 83% methanol and 60% hydrazine in aqueous 63% methanol, and analyzed as above. The results are shown in Table 3.

TABLE 3

| Run No. | $(NH_2)_2$ % | Immersed Hrs. | Side Chains H | CL | CM |
|---|---|---|---|---|---|
| 22 | 40 | 1 | 4 | 19 | 77 |
| 23 | 40 | 2 | 9 | 25 | 66 |
| 24 | 40 | 3 | 15 | 28 | 57 |
| 25 | 40 | 6 | 36 | 27 | 37 |
| 26 | 40 | 8 | 54 | 20 | 26 |
| 27 | 60 | 1 | 6 | 21 | 73 |
| 28 | 60 | 2 | 17 | 27 | 56 |
| 29 | 60 | 3 | 34 | 23 | 43 |
| 30 | 60 | 6 | 67 | 18 | 15 |
| 31 | 60 | 8 | 76 | 19 | 5 |

EXAMPLE 2

Ten strips 10 mm × 50 mm were cut from films treated in Example 1 in each of Runs Nos. 1, 4, 7, and 9, immersed in 100 ml 0.3 N sodium hydroxide solution in a mixture of one volume water and four volumes methanol at 20°C for 5 hours, washed neutral with methanol, immersed in 100 ml of 0.13 N hydrochloric acid in a mixture of one volume water and nine volumes methanol at 20°C for 1 hour, washed with methanol and air-dried.

No methoxyl groups could be found in the samples, indicating complete saponification of the residual ω-carbomethoxy groups.

A length of precisely 40 mm was marked on each strip, and the strips were then immersed in Briton-Robinson buffer solutions varying in pH from 2 to 11 until no further length change could be observed (approximately 1 minute). The buffer solutions were prepared by adding the necessary amount of 0.02 N sodium hydroxide solution to a solution consisting of 2.7 ml 95% orthophosphoric acid, 2.36 ml 96% glacial acetic acid, 2.47 g boric acid, and enough distilled water to make one liter.

The length L after immersion was measured, and the relationship between pH of the buffer used and the ratio of the final length L to the initial length $L_0$ is plotted for the film from Run No. 1 in FIG. 1, for Run No. 4 in FIG. 2, for Run No. 7 in FIG. 3, and for Run No. 9 in FIG. 4.

As is evident from comparison of the four Figures, the length change caused by absorption of water in the samples varied with the nature of the side chains.

EXAMPLE 3

A film treated in Run No. 20 in Example 1 was saponified with sodium hydroxide solution as described in Example 2, but not acidified so that it retained —COONa side chains. Samples of the film weighing about 80 mg were immersed 24 hours at 20°C in respective 100ml batches of copper sulfate solutions containing 635 mg and 1.91 mg copper ions respectively and 436 mg potassium sulfate, each batch having a pH of 4.3 obtained in the more dilute solution by adding a few drops of 0.01 N sulfuric acid.

The films were dried one hour at 120°C and 15 mm Hg, weighed precisely, and placed in 30 ml Kjeldahl flasks together with 0.5 ml concentrated sulfuric acid. The contents of each flask were heated until the film was carbonized, whereupon 5 – 6 drops concentrated nitric acid were added, and heating was continued for 3 hours. The residue was diluted to 1 liter with distilled water, and the copper content of each diluted solution was determined by means of an atomic adsorption spectrophotometer.

The film immersed in the more concentrated copper sulfate solution had picked up 16.3% copper based on the original dry film weight, which amounted to 2.15% of the copper in the more concentrated solution. The film immersed in the more dilute copper sulfate solution had picked up 2.16% copper based on its dry weight and adsorbed 92% of the copper originally present.

EXAMPLE 4

A film 20 microns thick was prepared from a copolymer of L-alanine and L-aspartic acid β-benzyl ester (mole ratio 1:4) having an intrinsic viscosity of 0.97. Strips 10 mm × 50 mm were cut from the film and immersed at 50°C for 3 hours in five polyamine solutions containing respectively:
A. 60% hexamethylenediamine in benzylalcohol,
B. 70% 1,3-diaminopropanol in benzylalcohol/water 1/1,
C. 80% iminobis-propylamine in DMF/methanol 2/1,
D. 70% 1,3-diaminocyclohexane in DMF,
E. 60% 3,9-bis(aminoethyl)-spirobismethadioxane in DMF.

The treated samples were washed in methanol until free of amine and immersed five hours at 20°C in 100 ml 0.5 N sodium hydroxide solution in a mixture of one volume water and four volumes methanol. They were then washed with methanol, air-dried, and immersed in water until a stable condition was reached.

The length changes of the strips upon immersion in water were measured as in Example 2, and the swelling or expansion ratios $L/L_0$ were found to be 1.42, 1.81, 1.22, 1.51, and 1.42 respectively, in the same order in which the amines are listed above. A control sample saponified without preceding amine treatment dissolved in water.

EXAMPLE 5

A film, 30 microns thick, was prepared from a copolymer of L-leucine and L-glutamic acid γ-methyl ester (mole ratio 1:3) having an intrinsic viscosity of 1.52. Pieces of the film 200 mm square were immersed for five hours at 40°C in a solution of 160 g ethylenediamine in 80 g benzyl alcohol, washed with methanol, immersed in 200 ml 0.3 N sodium hydroxide solution in a mixture of one volume of water and four volumes of methanol for one hour at 20°C, again washed with methanol, and air-dried.

Using the dialyzer and positive displacement pump of an Autoanalyzer (Technicon Instruments), the two films were used as dialysis membranes between Briton-Robinson buffers containing 180 mg urea per deciliter and the same buffers free from urea. In a buffer having a pH value of 4.3, the urea concentration was reduced to one half of its original value in six hours and 40 minutes. When the pH of the buffer solutions was 7.5, the half-time was 2 hours and 10 minutes.

EXAMPLE 6

Filaments (3 deniers × 50 monofilaments) of poly-L-glutamic acid γ-methyl ester having an intrinsic viscosity of 2.63 were wound loosely on polyethylene plates which were immersed thereafter for 2 hours at 40°C in a mixture of 7 parts diethylenetriamine and 3 parts methanol. The plate carrying the filaments was thereafter washed with methanol, immersed for one hour in a 0.3 N sodium hydroxide solution in a mixture of one volume water and five volumes methanol at 20°C, again washed with methanol, and air-dried.

Samples of the filaments were thereafter immersed in 100% methanol, 75%, 50%, and 25% aqueous methanol, and pure water, and the swelling or expansion ratio $L/L_o$ was determined as in Example 4 above, giving values of 1.00 in pure methanol, and 1.04, 1.10, 1.30, and 1.46 respectively with increasing water content.

What is claimed is:

1. A method of modifying a shaped body of a polypeptide having repeating units of the formula

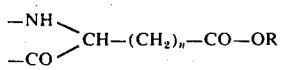

wherein $n$ is 1, 2, or 3, and R is lower alkyl having one to four carbon atoms, or phenyl-lower-alkyl, which comprises
   a. contacting said body with hydrazine or an amine having at least two primary amino groups until the carboalkoxy or carbophenylalkoxy groups in 2% to 96% of said units are converted to hydrazide or amide moieties corresponding to said hydrazine or amine, and 2% to one half of said units are cross-linked by said hydrazine or amine, while at least 2% of said carboalkoxy or phenylalkoxy groups remain unchanged, and
   b. contacting said body having said moieties with water in the presence of a saponification agent until said remainder of carboalkoxy or carbophenylalkoxy groups is saponified.

2. A method as set forth in claim 1, wherein said polypeptide is a homopolymer essentially consisting of said units.

3. A method as set forth in claim 1, wherein said polypeptide is a copolymer, said units being connected by repeating units of a neutral amino acid.

4. A shaped, solid body essentially consisting of at least one polypeptide having repeating units of the formula

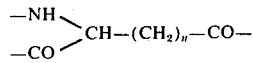

wherein $n$ is 1, 2, or 3, said $—(CH_2)_n - CO —$ constituting a side chain of each unit, the CO group in the side chain of a first portion of said units being bound by a primary amide linkage to nitrogen in a monovalent radical of hydrazine, two CO groups in respective side chains of a second portion of said units being linked by primary amide bonds to respective nitrogen atoms in divalent radicals of said hydrazine, the remainder of said units constituting a third portion of said units and having side chains of the formula

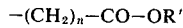

wherein R' is hydrogen or metal, each of said portions amounting to at least two percent of the total number of said units, said first portion amounting to not more than 96 percent of said total number, and said second portion constituting up to one half of said number.

5. A method as set forth in claim 1, wherein said shaped body is solid and is contacted with a liquid medium containing said hydrazine or said amine.

6. A method as set forth in claim 1, wherein said body is contacted with said amine.

* * * * *